United States Patent [19]

Weitz

[11] 4,177,498

[45] Dec. 4, 1979

[54] CONTROL PANEL FOR VEHICLE ENTERTAINMENT SERVICE SYSTEMS

[75] Inventor: Harry Weitz, New Hyde Park, N.Y.

[73] Assignee: Instrument Systems Corporation, Huntington, N.Y.

[21] Appl. No.: 885,419

[22] Filed: Mar. 10, 1978

[51] Int. Cl.$^2$ ............................................. H02B 1/04
[52] U.S. Cl. ................................. 361/360; 361/346; 200/296; 248/27.1
[58] Field of Search ................ 361/331, 334, 356–360, 361/346, 347, 362, 350; 174/55, 56; 324/156; 248/27.1; 200/296, 56 R, 51 R, 11 TW; 179/1 B, 1 D

[56] References Cited

U.S. PATENT DOCUMENTS

| | | | |
|---|---|---|---|
| 3,090,587 | 5/1963 | Peterson | 248/27.1 |
| 3,339,124 | 8/1967 | Jorgensen | 361/356 |
| 3,454,250 | 7/1969 | Gley | 248/27.1 |
| 3,463,886 | 8/1969 | Scanlon | 179/1 VE |

Primary Examiner—Gerald P. Tolin

Attorney, Agent, or Firm—Blum, Kaplan, Friedman, Silberman & Beran

[57] ABSTRACT

A control panel is provided incorporating a plurality of controls and an arrangement for the rapid mounting and demounting thereof in an aperture of a support. The mounting and demounting arrangement permits the retention of the panel with one side of the opening retained in a slot in a corresponding side of the panel and the other side of the opening being retained between a projection and a displaceable dog on the opposite side of said panel. Said dog is mounted on a bolt threaded in said panel for displacement between a first position in which the dog engages the wall of the opening and a second position wherein the dog is displaced both away from the wall of the opening in the axial direction of the bolt and pivoted by the bolt out of registration of the wall to permit release of the panel. The controls may include diaphragm-type push-button switches, slide switches and rotatable multi-position switches.

13 Claims, 6 Drawing Figures

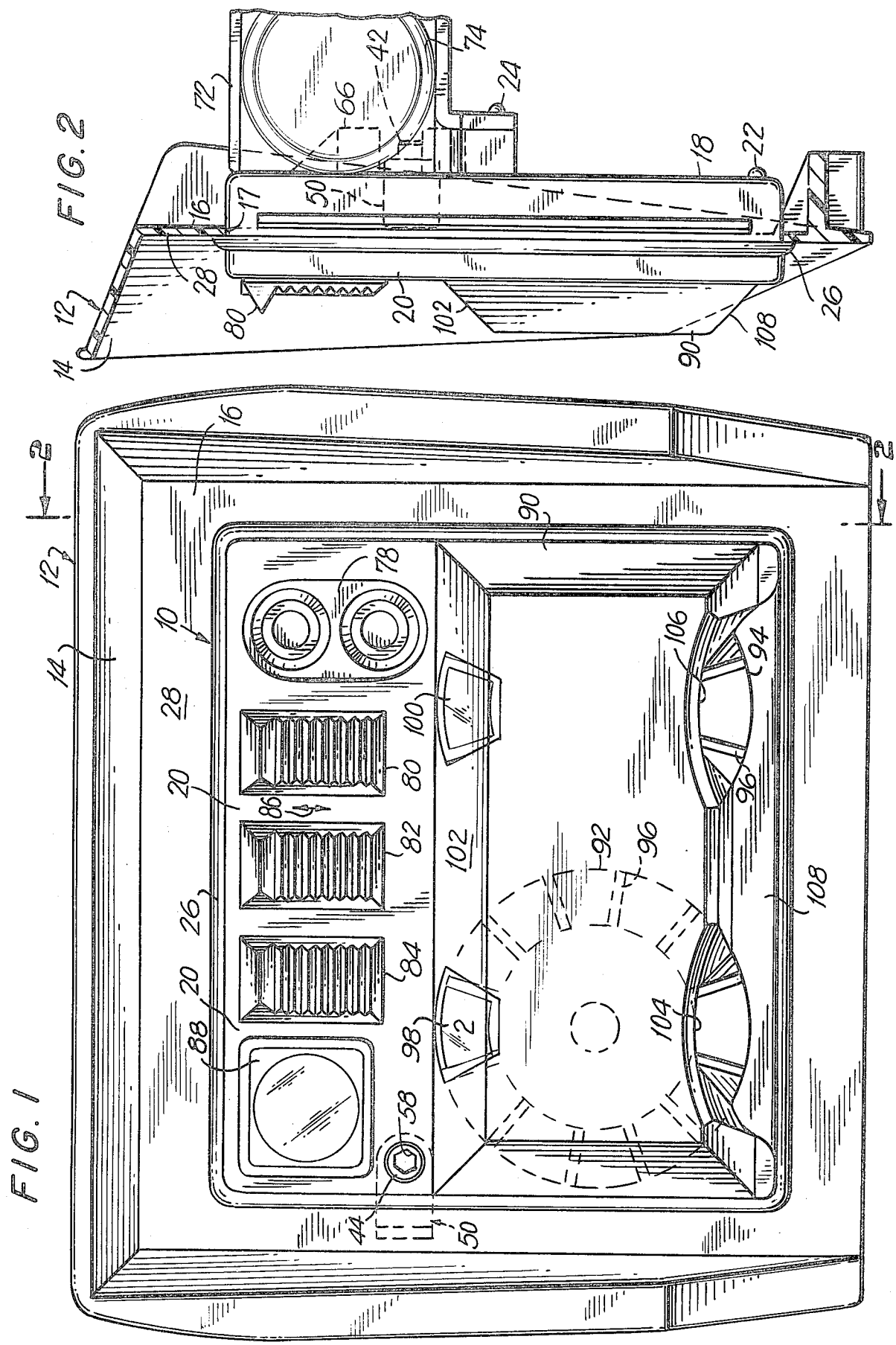

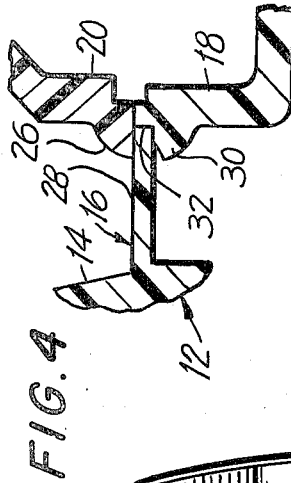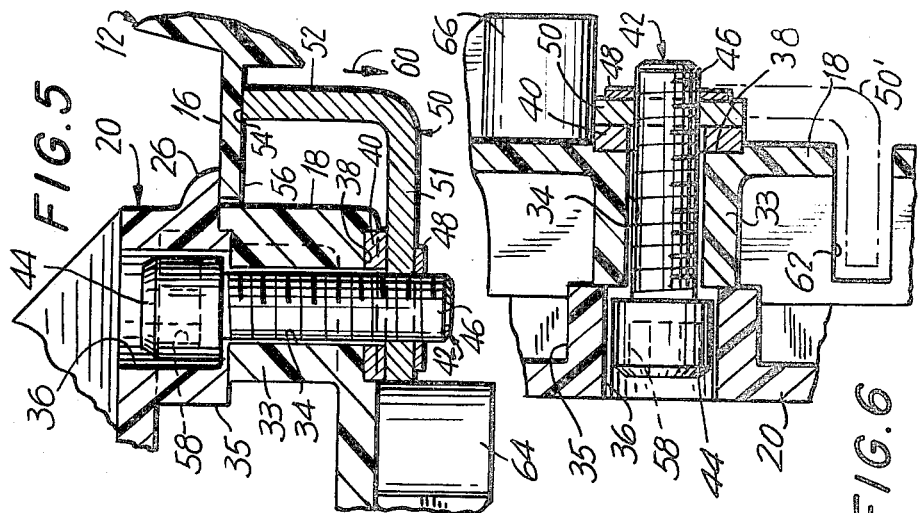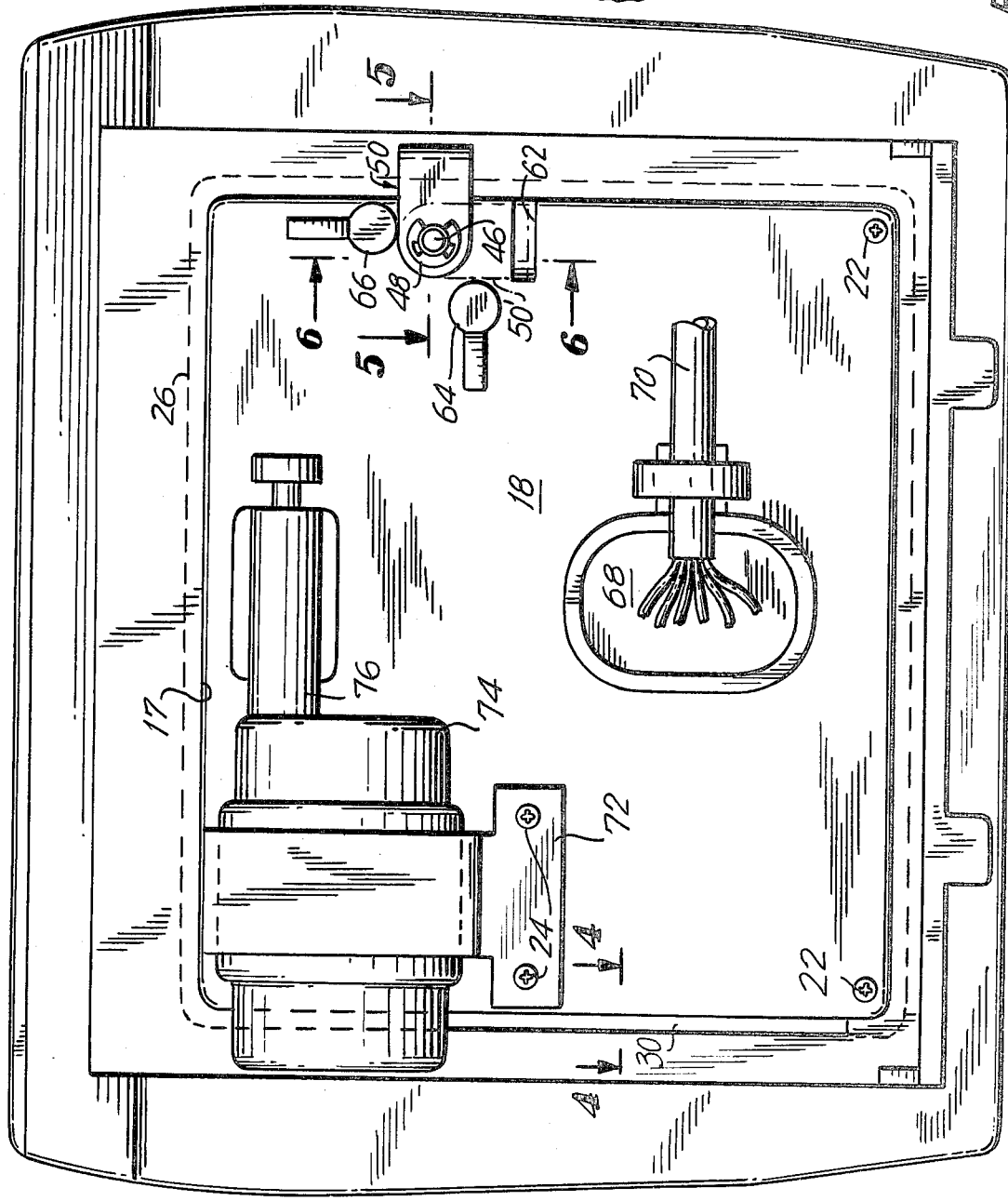

CONTROL PANEL FOR VEHICLE ENTERTAINMENT SERVICE SYSTEMS

BACKGROUND OF THE INVENTION

This invention relates generally to control panels, and in particular, to control panels which may be utilized as the passenger or seat control unit incorporated in the aircraft entertainment and service systems of commercial passenger aircraft. Examples of such aircraft entertainment-service systems and the circuitry which may be incorporated therein may be found in U.S. Pat. Nos. 3,566,038 of Martin J. Slavin, 3,585,307 of David R. Greenberg, 3,585,595 of Martin J. Slavin, Kenneth Cohen and Morton Pullman and 3,856,996 of David R. Greenberg, all assigned to the assignee hereof. As is described at length in said patents, a passenger or seat control unit may incorporate an electro-acoustic transducer and one or more controls in the form of switches permitting the user or passenger to select one of a plurality of channels of audio programming (monaural or stereo), to turn on an overhead light and/or air supply, to activate a "stewardess call" light or other signal and to reset said stewardess call light or signal. The transducer and controls must be mounted in the arm of an aircraft seat and must both be of aesthetic design and be as small as possible while permitting ready use. Especially important is that the control panel defining passenger or seat control unit be as thin as possible and further, that it be readily mounted and demounted in the seat for ease of initial assembly and for ease of maintenance without detracting from the sightliness of the design.

By providing a particularly flat configuration of controls and a rapid mounting and demounting arrangement, an improved seat control unit is provided.

SUMMARY OF THE INVENTION

Generally speaking, in accordance with the invention, a control panel is provided for mounting in an opening in a support defined at least in part by first and second peripheral rim portions, one of said rim portions being in each of at least two sides thereof, and including frame means formed with a slot on one side thereof dimensioned and positioned to receive said first rim portion and a projection extending from another side of said frame means and positioned for engagement against one surface of said second rim portion, dog means and a bolt mounted in threaded engagement with said frame means and supporting said dog means for the displacement of said dog means between a first position in which said second rim portion is engaged between said projection and said dog means for retaining said control panel in place and a second position at which said dog means is displaced from said first position both pivotably about the axis of said bolt and in the axial direction of said bolt out of registration and engagement with said second rim portion to permit the demounting of said control panel. The control panel supports a plurality of control means.

Said control means may include diaphragm-type push-button switch means, slide switch means and/or rotatable dial-type switch means. Said control panel may include an electro-acoustic transducer and acoustic socket means.

Said frame means may be formed with a pair of stops for defining said first and second positions of said dog means and limiting pivotable rotation thereof. Said bolt means may be formed with a head for the manipulation thereof, said frame means being formed to provide access thereto at the front of said frame means, said dog means being positioned rearwardly of said frame means for engagement against the rear surface of said rim.

Accordingly, it is an object of this invention to provide a control panel which may be readily mounted and demounted by the manipulation of a single bolt.

Another object of the invention is to provide a control panel of thin dimensions which is readily usable as a passenger or seat control unit as part of a passenger entertainment service system of an aircraft.

A further object of the invention is to provide a passenger or seat control unit of thin design.

Still other objects and advantages of the invention will in part be obvious and will in part be apparent from the specification and drawings.

The invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front plan view of the control panel in accordance with the invention mounted on a support;

FIG. 2 is a sectional view taken along lines 2—2 of FIG. 1;

FIG. 3 is rear plan view of the seat panel in accordance with the invention; and FIGS. 4, 5 and 6 are fragmentary sectional views taken along lines 4—4, 5—5 and 6—6 of FIG. 3.

DESCRIPTION OF THE PREFERRED EMBODIMENTS

Control panel 10 is shown mounted in a support frame 12 provided with a recess 14 having a bottom wall 16 defining a peripheral rim of an opening 17 dimensioned to receive the rear frame portion 18 of control panel 10. Support 12 would preferably be mounted in a vertical alignment as illustrated in FIG. 1 in the arm of a passenger aircraft seat.

Control panel 10 is preferably formed from a pair of plastic moldings defining a front frame portion 20 and a rear frame portion 18 joined together by screws 22 and 24. Front frame portion 20 is formed with a peripheral rim 26 which engages against the front surface 28 of bottom wall 16. As more particularly shown in FIGS. 3 and 4, rear frame portion 18 is provided with a lateral projection 30 in one side thereof positioned and dimensioned to define a slot 32 for receipt of the corresponding side of the rim of the opening 17 defined by bottom wall 16 of support 12.

Rear frame portion 18 is formed with a hub portion 33 adjacent the side thereof opposed to projection 30, hub portion 33 being formed with a bore 34 therethrough. Front frame portion 20 is likewise formed with a hub portion 35 in registration with hub portion 33 of rear frame portion 18. Hub portion 35 is formed with a bore 36 therethrough in registration with bore 34 but of a larger diameter. The bottom surface of rear frame portion 18 is formed with a recess 38 of substantially rectangular cross-section for receiving a nut 40. Nut 40 may be retained in recess 38 either by force fit or by adhesive as desired and may be considered a portion of the control panel frame. A bolt 42 having an enlarged head 44 and a threaded body 46 is provided. Head 44 is received within bore 36 of front frame portion 20 while the body 46 of bolt 42 extends through bore 34 and is threadably engaged with and projects beyond nut 40. Secured to bolt 44 by means of spring-lock 48 is an L-shaped dog 50. Specifically, arm 51 of dog 50 is secured to the body of bolt 42 adjacent nut 40 while arm 52 of dog 50 extends substantially parallel to said bolt, the end 54 thereof engaging against the rear surface 56 of the rim defined by bottom wall 16 of support 12 when oriented in the locked position of FIGS. 3 and 5. In this locked position, bolt 42 serves to draw dog 50 upwardly as viewed in FIG. 5 against inner wall 16 so that the control panel is retained by means of the slot defined by projections 26 and 30 on the one hand and the bearing force of dog 50 and projection 26 on the other hand.

As seen in FIG. 1, head 44 of bolt 42 is provided with a socket 58 for engagement by a tool such as an allen wrench which permits the axial pivoting of bolt 44. When said bolt is pivoted in the counter clockwise direction as viewed in FIG. 1 (counter clockwise direction as viewed in FIG. 3), dog 50 is moved in the direction of arrow 60 of FIG. 5, away from bottom wall 16 and is pivoted about the axis defined by body 46 of bolt 42 out of registration with said bottom wall and into a slot 62 formed in rear frame portion 18 (FIGS. 3 and 6). The alternate released position of dog 50 is shown by chain lines 50' in FIGS. 3 and 6. Rear frame member 18 is formed with a pair of projections 64 and 66 extending rearwardly thereof and positioned to serve as stops for the displacement of dog 50, projection 64 defining the engaged position of dog 50, projection 64 defining the released position thereof.

By the foregoing arrangement, control panel 10 may be readily mounted and demounted by merely rotating bolt 42 to engage a disengaged dog 50. Both the mounting and the demounting procedure can be readily accomplished from the front of the panel, thereby facilitating service and initial installation.

Referring to FIGS. 1, 2 and 3, front frame portion 20 and rear frame portion 18 support a printed circuit board 68 therebetween, said printed circuit board being electrically connected by means of leads 70 to a position exterior of the control panel, such as directly to lights or air controls or to a multiplexed entertainment and service system as described in the United States patents identified above. Also mounted on the outside of rear frame portion 18 by means of bracket 72 and screws 24 is an electro-acoustic transducer 74 of conventional design, connected by air tubes 76 to acoustic sockets 78 mounted on front frame portion 20, and by leads (not shown) to either the printed circuit board 68 or to a source of audio signals outside of the control panel. Also mounted on front frame portion 20 are three slide switches 80, 82 and 84 manually displaceable in the direction of arrows 86 of FIG. 1 and electrically coupled to the printed circuit board 68 internally of the control panel. Also mounted on said front frame portion is a diaphragm-type push-button switch 88 also electrically connected to the printed circuit board. Switches 80, 82, 84 and 88 may respectively be dedicated to light actuation, air actuation, stewardess call actuation and stewardess reset. While three slide switches and one diaphragm-type switch is depicted, any combination of diaphragm-type and slide switches may be utilized. Front frame portion 20 is provided with a projecting dial housing portion 90 which rotatably retains a pair of dial-type switches 92 and 94, each of which is formed with radially extending ribs in the upper peripheral portion thereof for the manual manipulation thereof. Dial switches 92 and 94 are electrically coupled to the printed circuit board and may, respectively, be utilized for channel selection and volume control of the audio signal which the user may selectively receive by plugging a headset into acoustic socket 78.

Dial housing portion 90 is formed with a pair of windows 98 and 100 in an upper wall 102 thereof to permit viewing of indicia indicative of channel and volume, respectively, on the periphery of dials 92 and 94. Dial housing portion 90 is also formed with a pair of openings 104 and 106 in a bottom wall 108 of said dial housing through which the ribbed peripheral portion of dials 92 and 94 extend for the manual manipulation of said dials by the user. In this manner, a user looking downwardly can readily see the setting of dials 92 and 94 and further, said dials can be readily manually manipulated by the user.

By the foregoing construction a compact control panel particularly suitable for use in passenger entertainment and service systems of commercial aircraft is provided. While the control panel is provided with an electro-acoustic transducer 74 and an acoustic socket 78 in the embodiment illustrated, the electro-acoustic transducer may be dispensed with and socket 78 may be in the form of a conventional electrical socket, the transducer being provided in the headset plugged into said socket.

It will thus be seen that the objects sets forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A control panel for mounting in an opening in a support defined on at least two sides by first and second rim portions, comprising frame means dimensioned for receipt in the opening and formed with a slot in one side thereof dimensioned for receipt of the first rim portion, said frame means being further formed with a projection on a side thereof positioned for engagement against the front surface of the second rim portion; circuit means carried by said frame means for performing a control function; bolt means threadably engaged to said frame means adjacent said projection and formed with a head portion accessable from the front of said control panel for the manual pivoting thereof between first and second positions; and dog means fixed to said bolt means for displacement in response to the pivoting of said bolt means relative to said frame means between said first position at which said dog means engages against the rear surface of the second rim portion for retaining the second rim portion between said dog means and said projection, and said second position at which said dog means is displaced both axially and pivotably relative to the axis of said bolt means away from and out of registration with the second rim portion, whereby said control panel may be readily removed from the support when said dog means is in said second position.

2. The control panel as recited in claim 1, wherein said dog means is formed from a L-shaped member, one arm of which is secured to said bolt means and the other arm is engageable against said second rim portion.

3. The control panel as recited in claim 2, wherein said frame means is formed with a slot in the side periphery thereof positioned for receipt of said other leg of said dog means at the second position thereof.

4. The control panel as recited in claim 1, including stop means carried by said frame means for limiting the pivotable displacement of said dog means at said first and second positions thereof.

5. The control panel as recited in claim 1, wherein said frame means includes a front frame portion, a rear frame portion secured to said front frame portion, said front and rear frame portions being formed with bores therethrough in registration for the receipt of said bolt means, and nut means secured to one of said front and rear frame portions in registration with said bores for threadably receiving said bolt means, said nut means being mounted to prevent the pivoting thereof relative to said front and rear frame portions.

6. The control panel as recited in claim 1, wherein said circuit means includes a plurality of control means mounted on the front surface of said frame means, said control means including switch means.

7. The control panel as recited in claim 1, wherein said front surface of said control panel is formed with a projecting dial housing portion having a top and a bottom wall, said circuit means including at least one dial switch means including a rotatably mounted dial, said dial housing portion being formed with a window in the top wall thereof in registration with said dial for viewing thereof and an opening in the bottom wall thereof through which a portion of the periphery of said dial extends for the manual manipulation of said dial.

8. The control panel as recited in claim 7, wherein said circuit means includes a plurality of further switch means on said control panel immediately above said dial housing.

9. The control panel as recited in claim 8, further including an acoustic socket means positioned adjacent said switch means above said dial housing portion.

10. A control panel comprising frame means defining a front surface; means for mounting said frame means with said front surface extending substantially vertically, said frame means front surface being formed with a forwardly projecting dial housing portion having top and bottom walls, said control panel including dial-type switch means including a dial rotatably mounted in said dial housing portion, said dial housing portion being formed with a window in the top wall thereof in registration with the periphery of said dial and an opening in the bottom wall thereof in registration with said dial and dimensioned to permit a portion of said dial to extend therethrough, said dial including position-indicating indicia thereon in registration with said window for viewing from above and means thereon in the portion extending through said opening for engagement by the finger of the user for the manual rotation of said dial.

11. The control panel as recited in claim 10, further including electro-acoustic socket means mounted on said control panel surface adjacent said switches above said dial housing portion.

12. The control panel as recited in claim 10, wherein said control panel further includes a plurality of switch means arranged in side-by-side relation on said front surface immediately above said dial housing portion.

13. A control panel for mounting in an opening in a support defined on at least two sides by first and second rim portions, comprising frame means dimensioned for receipt in the opening and formed with a slot in one side thereof dimensioned for receipt of the first rim portion, said frame means being further formed with a projection on a side thereof positioned for engagement against one surface of the second rim portion; bolt means threadably engaged to said frame means adjacent said projection; and dog means fixed to said bolt means for displacement in response to the pivoting of said bolt means relative to said frame means between a first position at which said dog means engages against the other surface of the second rim portion for retaining the second rim portion between said dog means and said projection, and a second position displaced both axially and pivotably relative to the axis of said bolt means away from and out of registration with the second rim portion, said frame means including a front frame portion, a rear frame portion secured to said front frame portion, said front and rear frame portions being formed with bores therethrough in registration for the receipt of said bolt means, and nut means secured to one of said front and rear frame portions in registration with said bores for threadably receiving said bolt means, said nut means being mounted to prevent the pivoting thereof relative to said front and rear frame portions, whereby said control panel may be readily removed from the support when said dog means is in said second position.

* * * * *